UNITED STATES PATENT OFFICE.

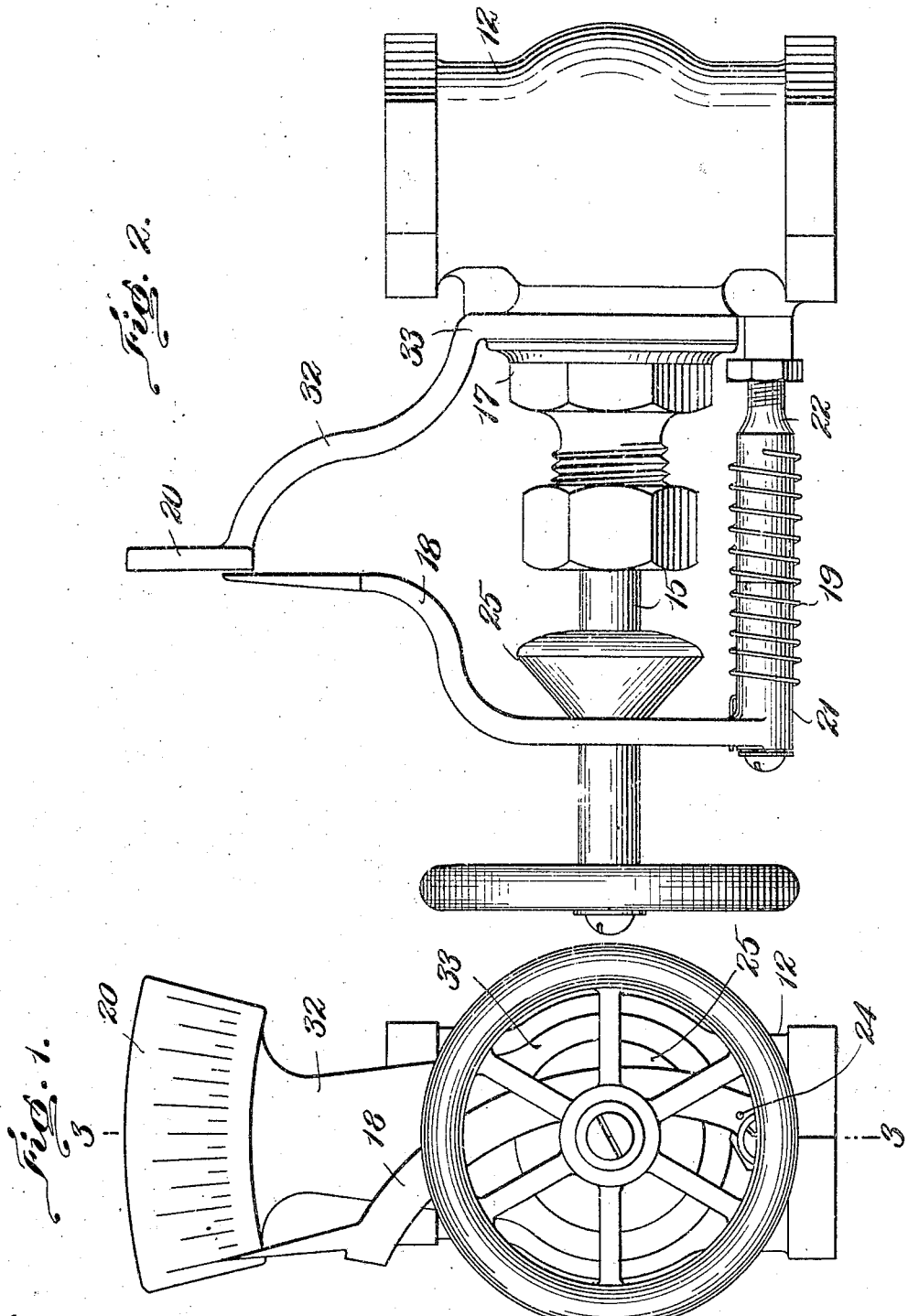

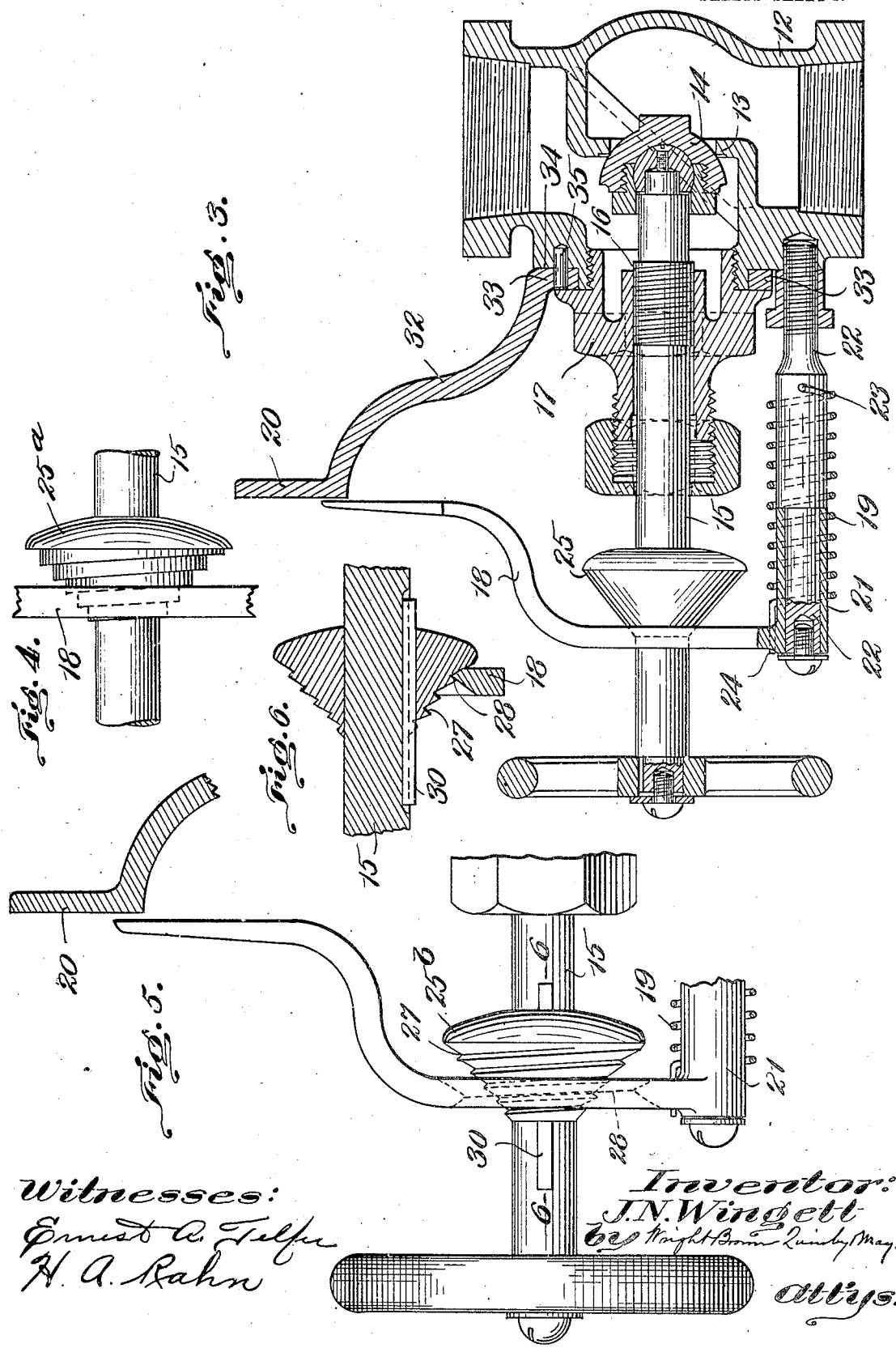

JOHN N. WINGETT, OF DENVER, COLORADO.

AUTOMATICALLY-REGISTERING VALVE.

1,131,885.  Specification of Letters Patent.  Patented Mar. 16, 1915.

Application filed April 9, 1913. Serial No. 759,934.

*To all whom it may concern:*

Be it known that I, JOHN N. WINGETT, a citizen of the United States, residing at Denver, in the county of Denver and State of Colorado, have invented certain new and useful Improvements in Automatically-Registering Valves, of which the following is a specification.

This invention relates chiefly to a valve, the head or seat-closing member of which is moved toward and from its seat by the rotation of a stem connected with the head, and it has for its object to provide means for automatically registering or indicating the exact position of the valve relatively to its seat, so that when the valve is opened its conducting capacity may be visually indicated at the exterior of the valve-casing.

The invention consists in the improvements which I will now proceed to describe and claim.

Of the accompanying drawings forming a part of this specification,—Figure 1 represents an end view of a valve embodying my invention. Fig. 2 represents a side view of the same. Fig. 3 represents a section on line 3—3 of Fig. 1. Figs. 4 and 5 represent fragmentary views of modifications hereinafter specifically referred to. Fig. 6 represents a section on line 6—6 of Fig. 5.

The same reference characters indicate the same parts in all the figures.

Referring to the drawings, and for the present to Figs. 1, 2, and 3, 12 represents a valve-casing, and 13 a valve-seat therein. 14 represents the member which coöperates with the seat in opening and closing the valve, said member being hereinafter called for convenience the valve head. 15 represents a stem adapted to move the valve head toward and from its seat, the stem in this embodiment of the invention being provided with a screw-threaded portion 16, engaged with an internal thread in the bonnet 17 of the valve, so that the stem is moved endwise when rotated and moves the valve head toward and from the seat. 18 represents a movable indicator which is suitably connected with the valve casing, and is normally held yieldingly in a predetermined position by a spring 19, the normal position of the indicator 18 being, for example, at the zero end of the graduated scale 20 which is suitably attached to the casing. The indicator 18 is preferably provided with an elongated hub or sleeve 21, adapted to turn on a stud 22 affixed to the casing 12, one end of the spring 19 being attached at 23 to the stud, the other end engaged at 24 with the indicator 18. The spring is adapted to press the indicator toward a suitable stop, which in this case may be the stem 15. 25 represents an operating member adapted to exert a displacing pressure against the indicator 18, and thereby move the indicator from its normal position. The member 25 in this embodiment of the invention, is a frusto-conical collar or enlargement, rigidly secured to and surrounding the stem 15, the form and arrangement of the member 25 being such that when the valve-head is closed, the member 18 bears on the stem at the smaller end of the member 25, and when the stem is moved endwise in moving the valve head from its seat, the tapered surface of the member 25 will exert a displacing pressure on the indicator 18 and move said indicator from its normal position to an extent corresponding to the endwise movement of the valve stem, the extent of separation of the valve head from its seat, and the conducting capacity of the valve being therefore indicated by the position of the pointer relatively to the scale 20.

Fig. 4 shows a tapered operating member 25$^a$ which, instead of having a frusto-conical face, has a helical face, the convolutions 26 of which gradually increase in diameter from the smaller to the larger end. The indicator 18 bears on this helical face which exerts a displacing pressure in a direction at a right angle to the axis of the valve stem, so that there is less frictional resistance to the movement of the indicator than is the case when the operating member has a frusto-conical face, and exerts a displacing pressure in a direction oblique to said axis. I find, however, that the elongated bearing of the hub 21 on the stud 22 reduces the binding pressure of the hub on the stud to a negligible minimum, when the indicator displacing pressure is oblique to the axis of the valve stem.

When the construction is such that the valve stem, in performing its functions, is rotated without moving lengthwise, as in gate and plug valves, an operating member 25$^b$, such as that shown by Fig. 5, may be employed. Said member is substantially frusto-conical and has a helical groove 27 engaging an acute angled edge 28 on the indicator. The member 25$^b$ is slidable on the stem 15 while rotating therewith, the stem being provided with a key or feather 30 engaging a groove in the member 25$^b$. Said member is therefore adapted to be moved lengthwise conjointly by the rotation of the stem, and the engagement of the indicator 18 with the groove 27, the edge 28 of the indicator being the equivalent of an internal screw-thread and the groove 27 being the equivalent of an external screw-thread, so that the rotation of the stem without longitudinal movement, rotates and causes a longitudinal movement of the member 25$^b$.

The scale 20 may be supported by any suitable means, such as an arm 32, having a hub 33 bearing on a seat 34 on the casing, as shown by Fig. 3, said hub being clamped between the casing and the bonnet 17 and prevented from turning by a dowel-pin 35. Any other suitable fixed indicating member or device adapted to coöperate with the movable indicator may be substituted for the scale 20, and if desired, the movable indicator may be used independently of any fixed indicating member.

My invention is distinguished by the fact that provision is made for registering extended or indeterminate movements of the valve head from and toward its seat, such as are caused by repeated rotations of the valve stem.

What I claim and desire to secure by Letters Patent is:—

1. A registering valve having a rotary stem, a movable indicator, a spring adapted to move the indicator in one direction, and a tapered operating member movable by the rotation of the stem and adapted to move the indicator in the opposite direction.

2. A registering valve having a rotary stem, a graduated scale, a movable indicator coöperating therewith, a spring adapted to move the indicator in one direction, and a tapered operating member movable by the rotation of the valve stem and adapted to move the indicator in the opposite direction.

3. A registering valve having an indicator-supporting stud attached to its casing, a movable indicator having a hub journaled on said stud, a spring adapted to yieldingly press the indicator toward the valve stem, and an operating member on said stem adapted to exert a displacing pressure on the indicator.

4. A registering valve having a scale-supporting arm and an indicator-supporting stud attached to its casing, a scale on said arm, a movable indicator having a hub journaled on said stud, a spring adapted to yieldingly press the indicator toward the valve stem, and an operating member on said stem adapted to exert a displacing pressure on the indicator.

In testimony whereof I have affixed my signature, in presence of two witnesses.

JOHN N. WINGETT.

Witnesses:
C. F. BROWN,
P. W. PEZZETTI.